United States Patent
Coteus et al.

[11] Patent Number: 6,127,840
[45] Date of Patent: Oct. 3, 2000

[54] DYNAMIC LINE TERMINATION CLAMPING CIRCUIT

[75] Inventors: Paul William Coteus, Yorktown, N.Y.; Daniel Mark Dreps, Georgetown, Tex.; Frank David Ferraiolo, Essex, Vt.

[73] Assignee: International Business Machines Corporation, Armonk, N.Y.

[21] Appl. No.: 09/042,912

[22] Filed: Mar. 17, 1998

[51] Int. Cl.[7] .................... H03K 17/16; H03K 19/003; H03K 19/0175
[52] U.S. Cl. ................... 326/30; 326/86; 326/90
[58] Field of Search ................ 326/30, 22, 23, 326/24, 83, 86, 89, 90

[56] References Cited

U.S. PATENT DOCUMENTS

| | | | |
|---|---|---|---|
| 4,567,364 | 1/1986 | Stuhlmiller | 326/30 |
| 4,958,093 | 9/1990 | Kosson et al. | |
| 5,027,008 | 6/1991 | Runaldue | |
| 5,159,216 | 10/1992 | Taylor et al. | |
| 5,329,190 | 7/1994 | Igarashi et al. | 326/30 |
| 5,528,190 | 6/1996 | Honnigford | |
| 5,546,016 | 8/1996 | Allen | |
| 5,614,842 | 3/1997 | Doke et al. | 326/58 |
| 5,793,222 | 8/1998 | Nakase | 326/27 |

*Primary Examiner*—Michael Tokar
*Assistant Examiner*—Daniel D. Chang
*Attorney, Agent, or Firm*—Anthony V. S. England; Brian F. Russell; Andrew J. Dillon

[57] ABSTRACT

A first circuit and a second circuit are connected by a pumped signal line that conducts a signal having a plurality of states. A dynamic termination circuit is connected to the pumped signal line. The dynamic termination circuit includes a switch responsive to the signal conducted by the pumped signal line such that the dynamic termination circuit is enabled only in response to certain of the plurality of states of the signal. In one embodiment, the switch is a first transistor that is coupled in series with a first impedance between a first reference voltage and an intermediate node. In this embodiment, the dynamic termination circuit further includes a second transistor coupled in series with a second impedance between a second reference voltage and the intermediate node and only first and second inverters that are each coupled between the intermediate node and the control input of a respective one of the first transistor and the second transistor.

6 Claims, 4 Drawing Sheets

DYNAMIC LINE TERMINATION CLAMPING CIRCUIT

BACKGROUND OF THE INVENTION

1. Technical Field

The present invention relates in general to electronic circuitry and, in particular, to a signal line termination circuit. Still more particularly, the present invention relates to a low-power dynamic line termination clamping circuit that permits high speed bus pumping.

2. Description of the Related Art

In conventional electronic systems comprising multiple interconnected complementary metal-oxide-semiconductor (CMOS) integrated circuits, communication between circuits is typically synchronous. That is, the period of the clock signal governing transmission of data between circuits is typically longer than the interval between launch of data by a transmitting circuit and receipt of the data by a receiving circuit. At higher communication clock frequencies, the physical proximity between circuits that would be required to maintain synchronous communication renders synchronous communication impractical. Accordingly, communication between circuits in high speed (e.g., 1–2 nanosecond data pulse width) environments is typically "pumped," that is, the latency between launch of the edge of a data pulse by a transmitting circuit and receipt of the edge of the data pulse by a receiving circuit is greater than the minimum data pulse width.

In contrast to synchronous circuit interconnections, which are typically source-terminated, conventional pumped interconnection designs employ end-termination in order to ensure signal integrity. A major problem with conventional end-terminated signal lines is that they dissipate a large amount of power. For example, referring to FIGS. 1A and 1B, there are illustrated pull-up and split-termination embodiments of pumped signal lines, respectively. Each of these embodiments includes a driver 10 and a receiver 12 coupled by a signal line 8. The embodiment illustrated in FIG. 1A has a pull-up termination resistor $R_1$ 14, and the embodiment depicted in FIG. 1B has split termination resistors $R_2$ and $R_3$ as shown at reference numerals 16 and 18. Resistors 14, 16, 18 constantly dissipate direct current (DC) power drawn by drivers 10.

In order to avoid the large power dissipation associated with conventional end-terminated signal lines, which can amount to tens of watts, it would be desirable to source-terminate the pumped signal lines interconnecting CMOS circuits. However, employing source termination on pumped nets introduces an additional design constraint, namely, that the round trip time of a data pulse sent from a transmitting circuit to a receiving circuit and then reflected back to the transmitting circuit cannot be equal to the minimum data pulse width. This constraint arises because a source terminated transmission line is effectively a transmission line with an open circuit (i.e., capacitor) at each end. If the length of the transmission line were to correspond to an integral multiple of the minimum data pulse, resonance would be achieved, creating a severe over ring and under ring that would inhibit reliable high speed switching.

As should thus be apparent, it would be desirable to provide a termination circuit for a pumped signal line that is capable of high frequency switching, has reduced power dissipation as compared with conventional end-terminated pumped signal lines, and is not subject to the length-dependent over and under ring problem of source-terminated pumped transmission lines.

SUMMARY OF THE INVENTION

It is therefore one object of the present invention to provide an improved electronic circuit.

It is another object of the present invention to provide an improved signal line termination circuit.

It is yet another object of the present invention to provide a low-power dynamic line termination clamping circuit that permits high speed bus pumping.

The foregoing objects are achieved as is now described. A first circuit and a second circuit are connected by a pumped signal line that conducts a signal having a plurality of states. A dynamic termination circuit is connected to the pumped signal line. The dynamic termination circuit includes a switch responsive to the signal conducted by the pumped signal line such that the dynamic termination circuit is enabled only in response to certain of the plurality of states of the signal. In one embodiment, the switch is a first transistor that is coupled in series with a first impedance between a first reference voltage and an intermediate node. In this embodiment, the dynamic termination circuit further includes a second transistor coupled in series with a second impedance between a second reference voltage and the intermediate node and only first and second inverters that are each coupled between the intermediate node and the control input of a respective one of the first transistor and the second transistor.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1A:
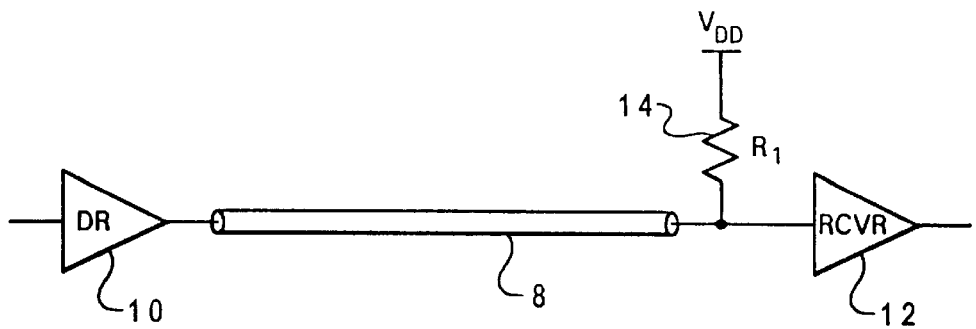
FIG. 1A illustrates a conventional end-terminated signal line terminated by a pull-up resistor.
Figure 1B:
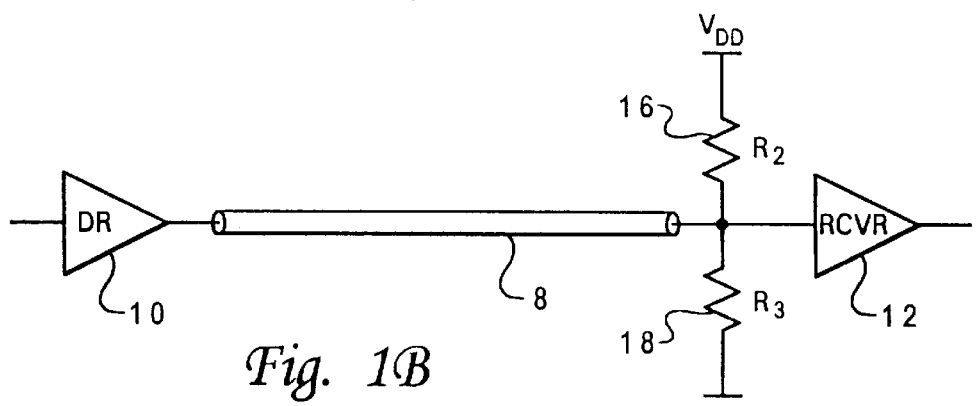
FIG. 1B depicts a conventional end-terminated signal line terminated by split termination resistors.
Figure 2:
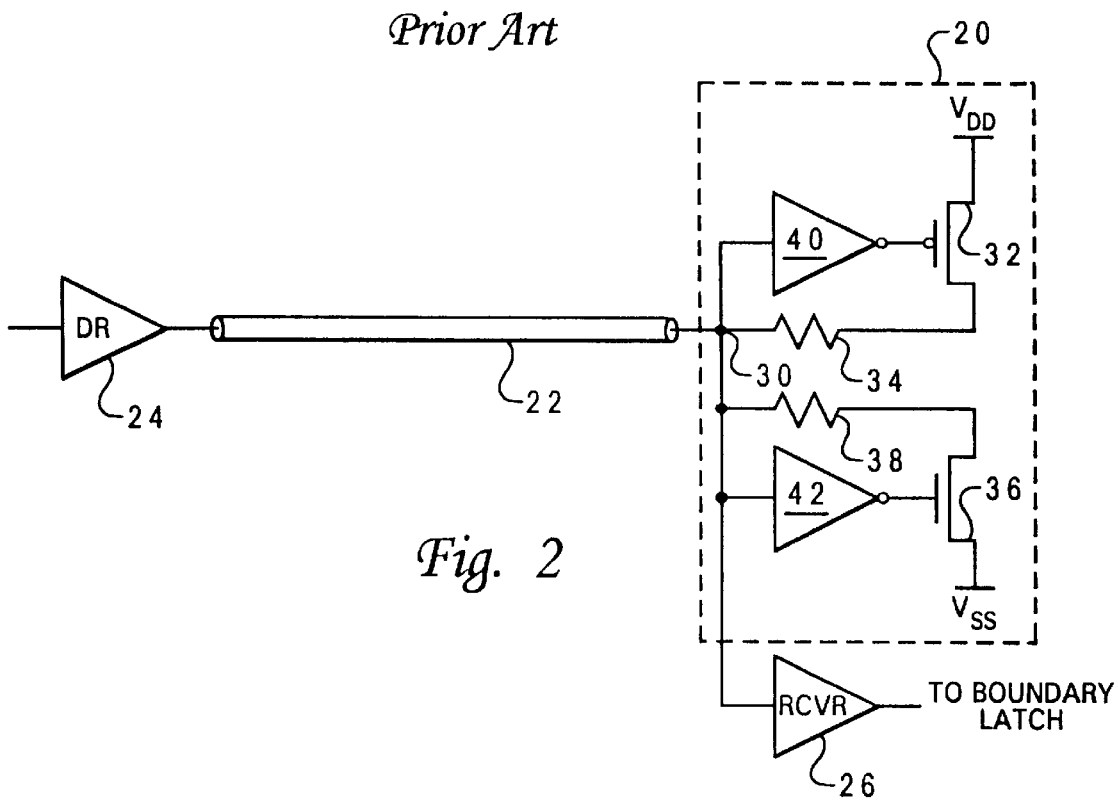
FIG. 2 shows an illustrative embodiment of an end-terminated pumped signal line having a dynamic line termination clamping circuit in accordance with the present invention.

With reference again to the figures and in particular with reference to FIG. 2, there is depicted an illustrative embodiment of a dynamic line termination clamping circuit in accordance with the present invention. As shown, dynamic line termination clamping circuit 20 is connected at the termination end of a pumped signal line 22, which is connected between a first integrated circuit chip including driver 24 and a second integrated circuit chip including receiver 26. As noted above, the pumping of signal line 22 is defined to mean that the latency between launch of the edge of a data pulse by the first integrated circuit chip and receipt of the edge of the data pulse by the second integrated circuit chip is greater than the minimum data pulse width.

Dynamic line termination clamping circuit 20 includes a CMOS P-channel transistor 32, which is coupled in series with resistor 34 between power supply voltage $V_{DD}$ and intermediate node 30, and a CMOS N-channel transistor 36, which is coupled in series with resistor 38 between reference voltage $V_{SS}$ and intermediate node 30. Resistors 34 and 38, which are optional, provide electrostatic discharge (ESD) protection to dynamic line termination clamping circuit 20 and the attached circuitry. As illustrated, the gates of transistors 32 and 36 are each connected to a respective one of first and second inverters 40 and 42, which each have an input connected to intermediate node 30.

In order to prevent transistor fight between transistors 32 and 36, inverters 40 and 42 are designed such that they have significantly different switching threshold voltages. As is well-known in the art, the switching voltage thresholds of inverters 40 and 42 can be selected by fabricating the constituent transistors of inverters 40 and 42 with appropriate aspect (length-to-width) ratios. In a preferred embodiment, inverter 40 has a switching voltage threshold of approximately 0.7 V, and inverter 42 has a switching voltage threshold of approximately 0.3 $V_{DD}$. Thus, transistor 32 is turned on in response to the voltage level of the signal present at intermediate node 30 rising to 0.7 $V_{DD}$ and is turned off in response to the voltage level of the signal dropping below 0.7 $V_{DD}$. Similarly, transistor 36 is turned on in response to the voltage level of the signal present at intermediate node 30 dropping to 0.3 $V_{DD}$ and is turned off in response to the voltage level rising above 0.3 $V_{DD}$. The operation of transistors 32 and 36 clamps intermediate node 30 (and the input of receiver 26) to $V_{DD}$ when driver 24 drives signal line 22 with a logic high and clamps intermediate node 30 to $V_{SS}$ when driver 24 drives signal line 22 with a logic low.

In an exemplary embodiment utilizing current CMOS technology, $V_{DD}$ can be 2 V, and $V_{SS}$ can be 0 V (ground potential). Assuming that signal line 22 has an impedance of 50 Ω for a 3 cm length, the combined impedance of transistor 32 and resistor 34 and of transistor 36 and resistor 38 is preferably approximately 70–100 Ω.

Because dynamic line termination clamping circuit 20 provides end termination rather than source termination to signal line 22, signal line 22 is not subject to the length-dependent resonance problems of source-terminated signal lines. In addition, because termination is applied by dynamic line termination clamping circuit 20 only when driver 22 is switching and when the voltage level of intermediate node 30 is near the quiescent rail, the power dissipation of dynamic line termination clamping circuit 20, which is small, is nearly all attributable to alternating current (AC) power rather than direct current (DC) power. For example, in a typical embodiment, if the voltage of intermediate node 30 is in the range of 0.0–0.3 $V_{DD}$ or 0.7–1.0 $V_{DD}$, receiver 26 respectively sinks or sources a current of between 1.0 and 4.0 milliamps (mA). If, however, the voltage of intermediate node is in the range of 0.3–0.7 $V_{DD}$, the current that receiver 26 sinks or sources is only a leakage current of ±50 microamps (µA). Moreover, because the block delay of each of inverters 40 and 42 can be designed to be less than 100 picoseconds for copper interconnect CMOS technology, dynamic line termination clamping circuit 20 is able to achieve high speed performance (e.g., responding to 2 nanosecond wide signal pulses) without pre-biasing, while clipping impedance mismatch-induced overshoot and undershoot.

Figure 3A:
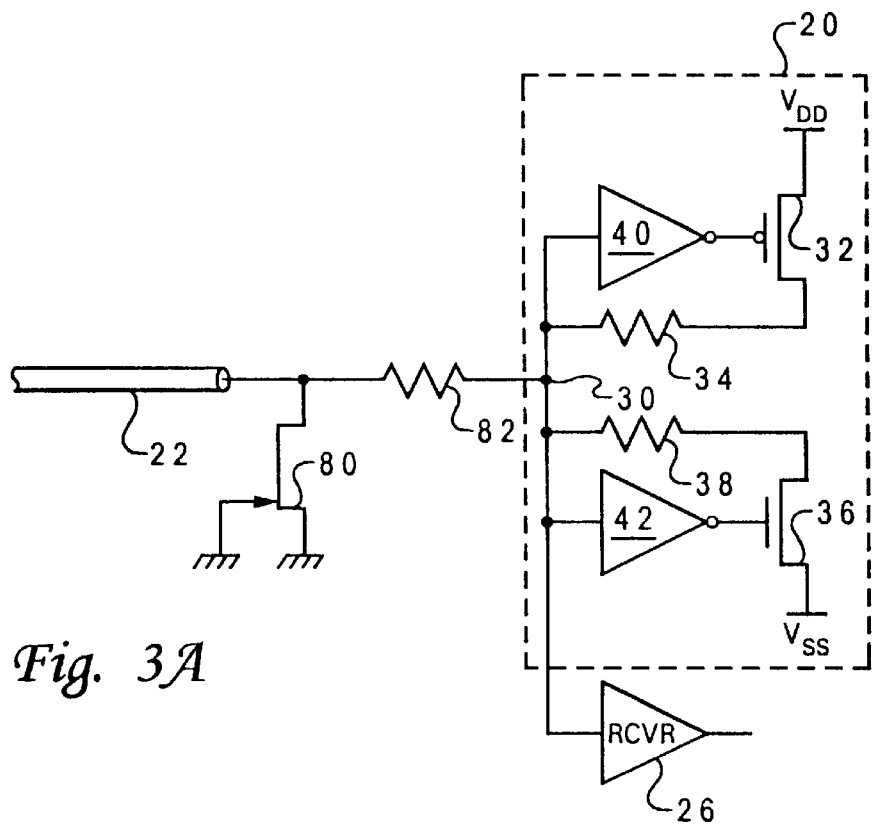
FIGS. 3A and 3B show illustrative embodiments of end-terminated pumped signal lines having dynamic line termination clamping circuits and electrostatic discharge (ESD) protection in accordance with the present invention.
Figure 3B:
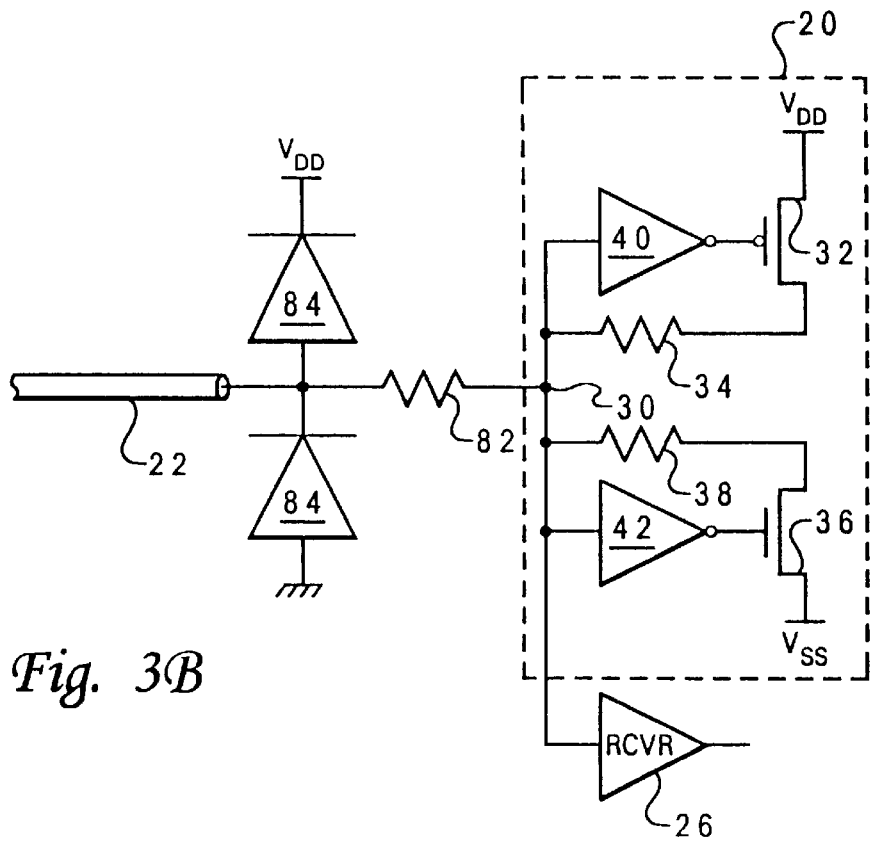

With reference now to FIGS. 3A and 3B, there are illustrated two embodiments of interconnect circuits that utilize dynamic line termination clamping circuit 20 in conjunction with circuitry that provides additional ESD protection. Referring first to FIG. 3A, an ESD resistor 82 is connected in series between signal line 22 and intermediate node 30 to damp signal pulses propagated on signal line 22. ESD resistor 82 may have a nominal value of approximately 100 Ω. In addition, an N-channel field effect transistor (FET) 80 is connected between signal line 22 and ground. Because the gate of N-FET 80 is grounded, N-FET 80 provides a path to ground for an ESD event. In order to permit high speed switching, NFET 80 is preferably designed to minimize the resistive-capacitive (R-C) gate delay.

Referring now to FIG. 3B, there is illustrated a second embodiment of an interconnect circuit having enhanced ESD protection. As illustrated, the embodiment shown in FIG. 3B is like that depicted in FIG. 3A, except that twin split diodes 84 are connected to signal line 84 in lieu of N-FET 80 to provide a conductive path for static charge.

Figure 4:
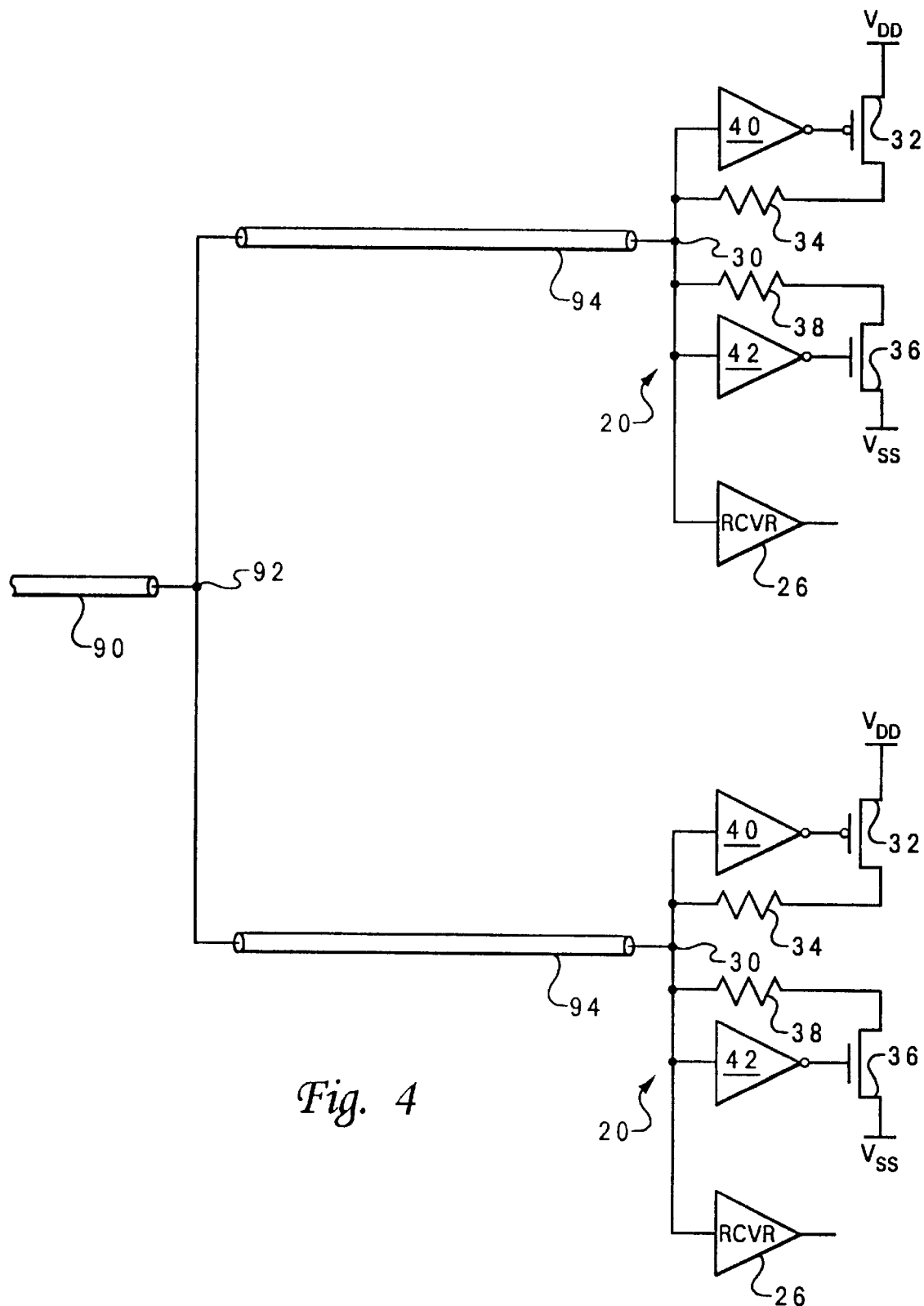
FIG. 4 depicts an illustrative embodiment of an end-terminated pumped signal line having two drop nets and two dynamic line termination clamping circuits in accordance with the present invention.

A dynamic line termination clamping circuit in accordance with the present invention can also be utilized to provide termination for a signal line having multiple drop nets. For example, referring now to FIG. 4, there is depicted an illustrative embodiment of a pumped signal line having two drop nets and two dynamic line termination clamping circuits in accordance with the present invention. As illustrated, a first signal line 90 is connected at a node 92 to two signal lines 94, which are each coupled to a respective receiver 26 at an I/O pin of an integrated circuit chip. Each of signal lines 94 is connected to a dynamic line termination clamping circuit 20 as depicted in FIG. 2. The only modification to dynamic line termination clamping circuit 20 required to support multiple drop nets is appropriate selection of the impedance of the transistor/resistor combinations. For embodiments in which a signal line 94 is short, the impedance of dynamic line termination clamping circuit 20 should be approximately twice that of the embodiment described above with respect to FIG. 2.

Figure 5:
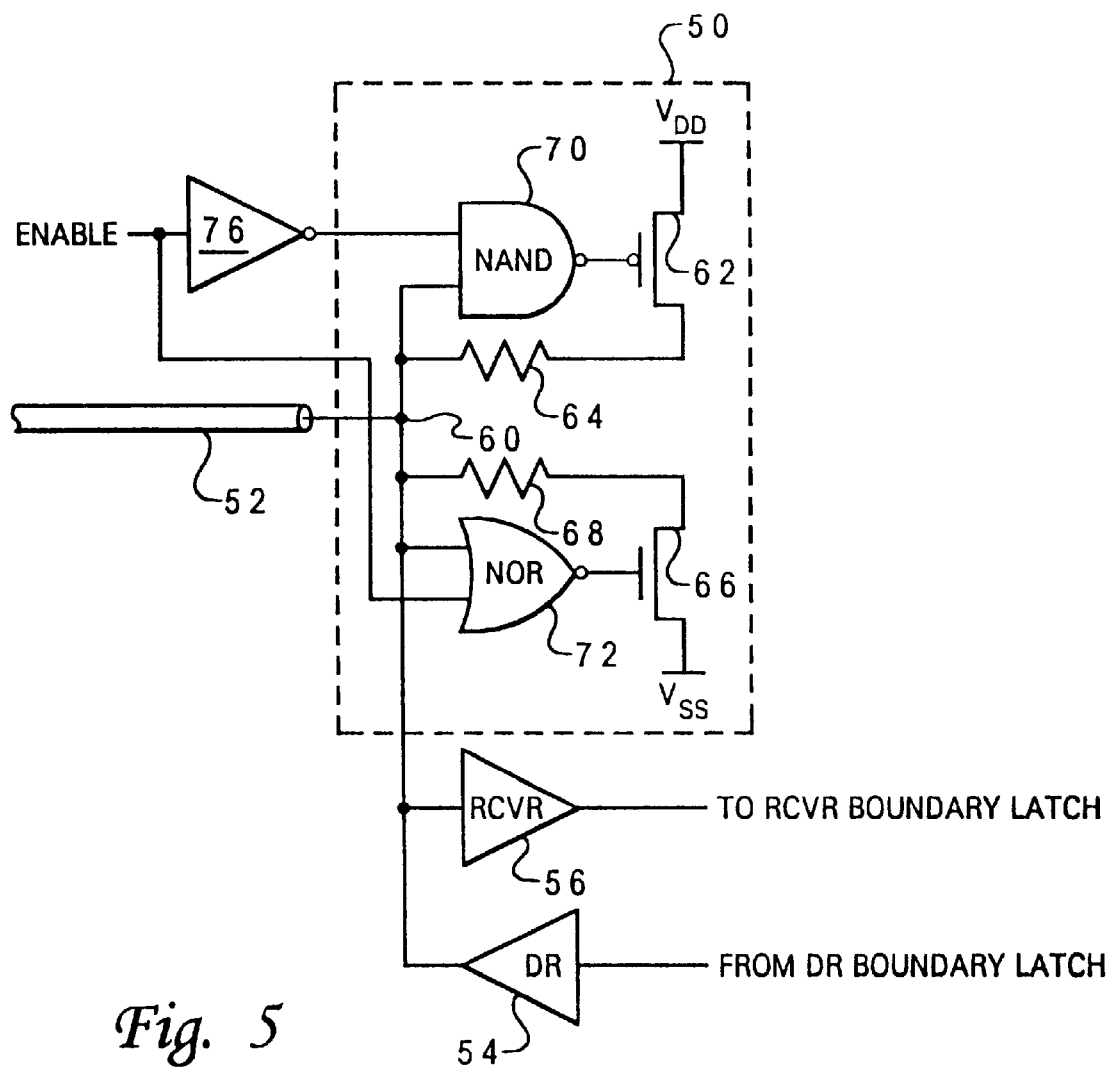
FIG. 5 shows an illustrative embodiment of an bi-directional pumped signal line having a dynamic line termination clamping circuit in accordance with the present invention.

Referring now to FIG. 5, there is depicted an illustrative embodiment of a dynamic line termination clamping circuit for use with a bi-directional signal line. As illustrated, dynamic line termination clamping circuit 50 is connected to a pumped bi-directional signal line 52, which is connected between a first integrated circuit chip (not illustrated) and a second integrated circuit chip that each include a driver 54 and a receiver 56.

Dynamic line termination clamping circuit 50 includes a CMOS P-channel transistor 62, which is coupled in series with resistor 64 between power supply voltage $V_{DD}$ and intermediate node 60, and a CMOS N-channel transistor 66, which is coupled in series with resistor 68 between reference voltage $V_{SS}$ and intermediate node 60. Like resistors 34 and 38 of dynamic line termination clamping circuit 20, resistors 64 and 68, which are optional, provide electrostatic discharge (ESD) protection to dynamic line termination clamping circuit 50 and the attached circuitry. As illustrated, dynamic line termination clamping circuit 50 further includes a NOR gate 72, which has a first input connected to an ENABLE signal, a second input connected to intermediate node 60, and an output connected to the gate of transistor 66. In addition, dynamic line termination clamping circuit 50 includes a NAND gate 70, which has a first input connected to the inverted ENABLE signal output by inverter 76, a second input connected to intermediate node 60, and an output connected to the gate of transistor 62.

The ENABLE signal, which may be generated by the second integrated circuit chip or peripheral circuitry, enables and disables the operation of dynamic line termination clamping circuit 50. When the ENABLE signal is logic high, the second integrated circuit is driving bi-directional signal line 52, and dynamic line termination clamping circuit 50 is disabled. Conversely, when the ENABLE signal is logic low, the second integrated circuit is receiving and dynamic line termination clamping circuit 50 is enabled. If dynamic line termination clamping circuit 50 is enabled, NAND gate 70 turns on transistor 32 when intermediate node 60 is near logic high (e.g., 0.7 $V_{DD}$), and NOR gate 72 turns on transistor 66 when intermediate node 60 is near logic low (e.g., 0.3 $V_{DD}$).

In addition to use in conjunction with bi-directional signal lines, dynamic line termination circuit 50 can also be utilized in other applications in which it is desirable to be able to enable and disable clamping. For example, dynamic line termination clamping circuit 50 may also be utilized in boundary scan applications in which it is desirable to scan values in at the input/output (I/O) pins of an integrated circuit chip. And because the block delay of NAND gate 70 and NOR gate 72 can also be designed to be less than 100 picoseconds, dynamic line termination circuit 50 is also capable of high speed performance.

As has been described, the present invention provides an improved dynamic line termination clamping circuit for use with pumped signal lines. The dynamic line termination clamping circuit is capable of high frequency switching, has low power dissipation, and is not subject to length-dependent over ring and under ring.

While the invention has been particularly shown and described with reference to a preferred embodiment, it will be understood by those skilled in the art that various changes in form and detail may be made therein without departing from the spirit and scope of the invention. For example, although dynamic line termination clamping circuits have heretofore been described with reference to stand alone circuits (e.g., application specific integrated circuits (ASIC)), those skilled in the art will appreciate that a dynamic line termination clamping circuit in accordance with the present invention can be fabricated as a portion of an I/O cell of an integrated circuit chip.

What is claimed is:

1. An apparatus comprising:

an intermediate node;

a signal line coupled to said intermediate node;

a driver and a receiver coupled to said signal line at said intermediate node;

a dynamic line termination circuit, including:

a first transistor and a second transistor that are each coupled in series with a resistor between a respective one of first and second reference voltages and the intermediate node, each of said first and second transistors having a control input;

first control logic coupled to said control input of said first transistor, wherein said first control logic enables said first transistor in response to an indication that said node is at a termination end of a signal line and a signal in said signal line being in a first state;

second control logic coupled to said control input of said second transistor, wherein said second control logic enables said second transistor in response to an indication that said node is at said termination end and a signal in said signal line being in a second state; and wherein a dynamic impedance of an enabled transistor among said first and second transistors and said resistor is substantially greater than an impedance of said signal line.

2. The apparatus of claim 1, said first control logic including a NAND gate.

3. The apparatus of claim 1, said second control logic including a NOR gate.

4. The apparatus of claim 1, and further including said signal line, wherein said signal line is a pumped signal line.

5. The apparatus of claim 1, wherein said dynamic impedance of an enabled transistor among said first and second transistors and said resistor is at least forty percent greater than an impedance of said signal line.

6. The apparatus of claim 5, wherein said dynamic impedance of an enabled transistor among said first and second transistors and said resistor is less than one hundred percent greater than an impedance of said signal line.

\* \* \* \* \*